(12) United States Patent
Huang et al.

(10) Patent No.: US 10,289,394 B2
(45) Date of Patent: May 14, 2019

(54) SELECTIVE GENERATION OF MULTIPLE VERSIONS OF MACHINE CODE FOR SOURCE CODE FUNCTIONS FOR EXECUTION ON DIFFERENT PROCESSOR VERSIONS AND/OR ARCHITECTURES

(71) Applicant: Oracle International Corporation, Redwood City, CA (US)

(72) Inventors: Alfred Huang, Fremont, CA (US); William Y. Chen, Los Altos, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 59 days.

(21) Appl. No.: 15/290,059

(22) Filed: Oct. 11, 2016

(65) Prior Publication Data

US 2018/0101370 A1  Apr. 12, 2018

(51) Int. Cl.
*G06F 9/44* (2018.01)
*G06F 9/445* (2018.01)
*G06F 8/41* (2018.01)
*G06F 11/36* (2006.01)

(52) U.S. Cl.
CPC .............. *G06F 8/447* (2013.01); *G06F 8/443* (2013.01)

(58) Field of Classification Search
CPC ..... G06F 8/24; G06F 8/47; G06F 8/52; G06F 8/443; G06F 8/445; G06F 8/447; G06F 9/4428; G06F 9/4452; G06F 8/35; G06F 8/54; G06F 8/315; G06F 8/41; G06F 16/2365; G06F 8/30; G06F 8/20; G06F 8/71; G06F 9/45516; G06F 9/449; G06F 9/465; H04L 67/10
See application file for complete search history.

(56) References Cited

U.S. PATENT DOCUMENTS

| | | |
|---|---|---|
| 6,286,134 B1 | 9/2001 | Click, Jr. et al. |
| 6,473,897 B1 | 10/2002 | Ansari et al. |
| 6,658,656 B1 | 12/2003 | Thompson |

(Continued)

OTHER PUBLICATIONS

Edler von Koch et al., Exploiting function similarity for code size reduction, 10 pages (Year: 2014).*

(Continued)

*Primary Examiner* — Thuy Dao
(74) *Attorney, Agent, or Firm* — Marsh Fischmann & Breyfogle LLP; Jonathon A. Szumny; Kent A. Lembke (57) ABSTRACT

Utilities for use in generation of a single executable (e.g., single set of machine code) compatible with processors of multiple different architectures and/or versions with reduced levels of code bloating, no or limited changes to the source code, no or limited special code and/or data sections in the executable, and the like. Specifically, a compiler can selectively generate machine code for each of one or more particular C++ functions for each of a plurality of different processor versions and/or architectures in a "multi-version mode" or "multi-architecture mode" to allow such functions to perform better under different processor versions or architectures, avoid the need to maintain multiple entire object code sets for different processor versions or architectures, and allow for maintenance of a substantially complete C++ code mechanism.

19 Claims, 5 Drawing Sheets

(56) References Cited

U.S. PATENT DOCUMENTS

| | | | |
|---|---|---|---|
| 6,735,756 B1* | 5/2004 | Linn | G06F 9/44521 716/116 |
| 6,738,967 B1 | 5/2004 | Radigan | |
| 7,171,649 B1* | 1/2007 | Lawrence | G06F 9/4431 712/E9.085 |
| 7,865,862 B2 | 1/2011 | Chou et al. | |
| 8,296,743 B2 | 10/2012 | Linderman et al. | |
| 8,479,177 B2* | 7/2013 | Kirshnaswamy | G06F 9/445 717/146 |
| 8,645,934 B2 | 2/2014 | Fontenot et al. | |
| 9,081,587 B1 | 7/2015 | Li et al. | |
| 9,098,292 B1* | 8/2015 | Zhang | G06F 8/35 |
| 9,195,443 B2 | 11/2015 | Kuesel et al. | |
| 9,459,848 B1* | 10/2016 | Horie | G06F 8/427 |
| 9,886,251 B2* | 2/2018 | Guan | G06F 8/41 |
| 9,990,194 B2* | 6/2018 | Ahmad | G06F 8/315 |
| 10,133,559 B2* | 11/2018 | Ji | G06F 8/443 |
| 2003/0131147 A1* | 7/2003 | Wilt | G06F 8/447 719/321 |
| 2004/0268309 A1* | 12/2004 | Grover | G06F 8/20 717/120 |
| 2009/0138847 A1* | 5/2009 | Beckwith | G06F 8/4434 717/108 |
| 2010/0299659 A1* | 11/2010 | Kirshnaswamy | G06F 8/30 717/147 |
| 2013/0339928 A1* | 12/2013 | Trofin | G06F 9/44521 717/122 |
| 2016/0139894 A1* | 5/2016 | Slesarenko | G06F 8/44 717/144 |
| 2016/0321045 A1* | 11/2016 | Radigan | G06F 8/443 |
| 2017/0351492 A1* | 12/2017 | Szpak | G06F 8/34 |

OTHER PUBLICATIONS

O. Green, When merging and branch predictors collide, 8 pages (Year: 2014).*

Compile and Optimize for Different Target Architectures http://stackoverflow.com/questions/1296185/compileandoptimizefordifferenttargetarchitectures 2016.

Android Developers. "Supporting Different Platform Versions" Check System Version at Runtime 2016.

* cited by examiner

SELECTIVE GENERATION OF MULTIPLE VERSIONS OF MACHINE CODE FOR SOURCE CODE FUNCTIONS FOR EXECUTION ON DIFFERENT PROCESSOR VERSIONS AND/OR ARCHITECTURES

BACKGROUND

1. Field of the Invention

The present invention generally relates to the compiling of computer programs and, more particularly, to compiler optimizations for generating different sets of machine code for execution on different processor versions and/or architectures.

2. Relevant Background

Modern computer programs are typically written in a high-level programming language that allows data structures and algorithms in a computer program to be expressed in a form that can be easily read and understood by a human programmer. A software tool, called a "compiler," can translate a computer program written in a high-level programming language into a set of intermediate code instructions and/or a set of low-level machine instructions, which can be executed by a computer's hardware. The program written in the high-level programming language is called the "source code." The set of low-level machine instructions is called "object code." In practice, a program typically includes multiple source code files from which a number of object code files can be derived. These multiple object code files and various libraries that include standard routines can be linked by a "linker" to create a single executable program (an "executable"). The executable program can then be executed on a computer.

Over time, different processor architectures evolve into different versions with additional instructions and features (e.g., supporting different integer ranges, ability to perform parallel computing, etc.). However, compiler-generated object code for one architecture and/or version of a processor may not perform optimally or even at all with another architecture and/or version of a processor. Software programmers often want their product to be executable by as many processor architectures and/or versions as possible, thereby allowing a greater share of the market to purchase the product. This desire is typically balanced against the programmer's desire to write code that works efficiently and makes the best use of the particular processor architecture and/or version which is executing the code. One way to do so is to write a separate program for each possible processor architecture and/or version which might execute the program. However, doing so is time-intensive, costly, and often results in a large amount of unnecessary duplication. Another option is to use the lowest level architecture that can run on all versions which thus results in the lowest performance.

Compilers can often perform various optimizations during program compilation to produce better performing object code, and consequently, more efficient executable programs. Common optimization techniques include loop optimization, data flow optimization, dead code elimination, inline expansion, constant propagation, and so on. The scope of code optimization can be intra-procedural, i.e., within a single procedure or code block, or inter-procedural, i.e., across multiple procedures or even multiple source code files. Thus, another approach to allowing programs to be compatible with and executed by processors of different architectures and/or versions is to compile and optimize the same source program separately for many different processor architectures and/or versions.

As one example, each of the generated sets of object code (e.g., machine code, binary code, etc.) may be stored in different respective libraries which may be accessed at run time based on the particular architecture and/or version of the particular processor being used. However, having to build and maintain different respective libraries utilizes increased levels of system resources leading to sub-optimal operational efficiency. As another example, each of the generated sets of object code may be stored or contained in a single multi-architecture object (e.g., fat object, fat binary, multi-architecture binary). After the particular processor architecture and/or version is determined in any appropriate manner, the application may select and the processor may execute the particular generated object code set for the particular processor architecture and/or version (e.g., via a control flow jump to a relevant starting address of a specific code version at run time, link time selection of the specific code version, etc.). However, use of fat objects and the like results in increased levels of code bloating, can require user of other tools, and necessarily requires enhancement to the object code, all of which lead to various inefficiencies.

SUMMARY

In view of the foregoing, disclosed herein are utilities (e.g., systems, methods, etc.) that allow for the generation of a single executable (e.g., single set of machine code) that is compatible with processors of multiple different architectures and/or versions with reduced levels of code bloating, no or limited special code and/or data sections in the executable, and the like. As will be discussed, the disclosed utilities include a compiler that selectively generates machine code for each of one or more particular C++ functions for each of a plurality of different processor versions and/or architectures in a "multi-version mode" or "multi-architecture mode" to allow such functions to perform better under different processor versions or architectures, avoid the need to maintain multiple entire object code sets for different processor versions or architectures, and allow for maintenance of a substantially complete C++ code mechanism.

Each of one or more functions in source code written in a high level language (e.g., C++) and to be compiled into different machine code portions that are respectively optimized for execution on a plurality of different processor versions (e.g., sparc3, sparc4, sparc5) may initially be identified in any appropriate manner. In one arrangement, a user may manually identify and indicate in any appropriate manner one or more functions in source code to be "multi-versioned" (e.g., via a user interface before compilation of the source code). In another arrangement, a compiler may be configured to profile the source code for one or more functions that are capable of being translated into different machine code versions for different corresponding processor versions.

For each particular function in the source code to be multiversioned, the compiler may proceed to generate various internal (e.g., intermediate) representations in a language and structure the same as or similar to the source code language (e.g., C++) to encapsulate different machine code versions of the function optimized for executed by different processor architectures or versions. What results is a single executable program having various functions that can execute on any of the different processor architectures or versions. For each particular multiversioned function, the compiler is configured to replace all calls to the particular function with a function pointer to the correct machine code representation of the function based on the particular processor version and/or architecture on which the function is to be executed.

As an example, the compiler may generate a "base" or lowest level class (a compiler internal representation such as "USR1") that includes machine code representing the function for use on a first of a plurality of different processor architectures or versions (e.g., SPARC T3). Broadly, a "class" as used herein may be a data structure or extensible program-code-template for creating objects, providing initial values for state (e.g., member variables) and implementations of behavior (e.g., member functions or methods). In one arrangement, the compiler may automatically treat the particular class in which the function was created in the source code as the base class. As part of generating the base class, the compiler may also convert the specific function name (e.g., "func( )") into a "virtual function" in any appropriate manner for reasons discussed below. For instance, the compiler may append the word "virtual" before declaring the function in the base class (e.g., "virtual int func( )").

The compiler may also automatically generate one or more derived classes (e.g., further compiler internal representations such as "USR1_sparc4", "USR1_sparc5") of the base class that respectively include machine code representing the function for use on one or more additional processor architectures or versions (e.g., SPARC T4, SPARC T5, etc.). As an example, each derived class may include a different definition (i.e., different machine code) for the virtual function defined in the base class. For instance, derived class "USR1_sparc4" may define "virtual int func( )" to be machine code representing the function for use on the SPARC T4 processor while derived class "USR1_sparc5" may define "virtual int func( )" to be machine code representing the function for use on the SPARC T5 processor.

When the initialization class (e.g., _init_USR1) is subsequently instantiated by the compiler, a function pointer is set that points to the appropriate specified base/derived class and its corresponding specific machine code therein based on the specific particular processor architecture or version at runtime (e.g., through use of the virtual function in the base and derived classes). After compilation and linking, what results is an executable program that can execute on any of the particular processor architectures and/or versions. On a SPARC T5 processor, for instance, the function pointer will be set to "func" of derived class USR1_sparc5, thus compiling all calls to the function with sparc5 code to obtain enhanced performance on a SPARC T5 processor.

In one aspect, a computer-implemented method for use in compiling source code of a computer program includes identifying a first function in source code of a program; generating a base class that includes machine code representing the first function for execution on a first version of a processor; and generating at least one derived class of the base class that includes machine code representing the first function for execution on at least one additional version of the processor, where the machine code of the base class or at least one derived class of the base class is configured to be executed by a processor based upon a determined version of the processor.

In one arrangement, the method may include determining that the program is to be executed on the first version of the processor, replacing calls to the first function in the source code with pointers to the base class, and executing the program on the first version of the processor, where the executing includes executing the machine code representing the first function for execution on the first version of the processor. In another arrangement, the method may include determining that the program is to be executed on the at least one additional version of the processor, replacing calls to the first function in the source code with pointers to the at least one derived class of the base class, and executing the program on the at least one additional version of the processor, where the executing includes executing the machine code representing the first function for execution on the at least one additional version of the processor. For instance, the generating of the first base class may include declaring the first function as virtual, and the generating of the at least one derived class of the base class may include declaring the first function as virtual.

In another aspect, a non-transitory, computer-readable storage medium is disclosed, and storing program instructions that when executed on one or more computers cause the one or more computers to perform identifying a first function defined within a C++ class in source code of a program to be optimized for execution by a plurality of different versions of a processor, where the first function is identified by a first function name in the source code; declaring the first function name as virtual in an intermediate representation of the C++ class; generating machine code that represents the first function for execution on a first version of the plurality of different versions of the processor; appending the generated machine code that represents the first function for execution on the first version of the processor to the first function name in the IR of the C++ class; generating additional machine code that represents the first function for execution on one or more additional versions of the plurality of different versions of the processor; appending the generated machine code that represents the first function for execution on the one or more additional versions of the plurality of different versions of the processor to the first function name in one or more IRs of one or more derived classes of the C++ class; and replacing calls to the first function name in the program with calls through a pointer that points to the first function name in the C++ class or one of the one or more derived classes of the C++ class.

In a further aspect, a computer-implemented method for dynamic selection and implementation of compiler-generated machine code for a program based on a determined version of processing device for executing the program is disclosed, where the method includes receiving, at a compiler, source code of a program that includes a plurality of functions; identifying a first of the plurality of functions; generating an intermediate representation (IR) of a first C++ class of the first function that includes machine code representing the first function for execution on a first version of a processing device; generating an IR of a derived C++ class of the first C++ class of the first function that includes machine code representing the first function for execution on a second version of the processing device; coalescing the IRs of the first C++ class and the derived C++ class of the first C++ class into an object file; and assembling the object file with other compiled portions of the source code into an executable file.

In addition to the exemplary aspects and embodiments described above, further aspects and embodiments will become apparent by reference to the drawings and by study of the following descriptions.

DETAILED DESCRIPTION

The present disclosure is generally directed to systems, apparatuses, and methods (e.g., utilities) that are configured to compile source code of a program in a manner that allows for effective execution of the program on different processor versions and/or architectures with reduced levels of code bloating, no or limited special code and/or data sections in the executable, and the like. As will be discussed herein, the compiler disclosed herein is configured to identify at least one function in C++ source code of a program that is configured to be executed differently and/or more efficiently on different processor versions and/or architectures, and then generate various internal or intermediate representations using language or semantics the same as or similar to C++ that respectively includes machine code representing the function for execution on the different processor versions and/or architectures. Calls to the function in the program can be replaced with pointers to one of the sets of machine code based on a particular processor version or architectures that is to execute the program. The need to maintain multiple entire object code sets for different processor versions or architectures is avoided or reduced and a substantially complete C++ code mechanism can be maintained.

Figure 1:
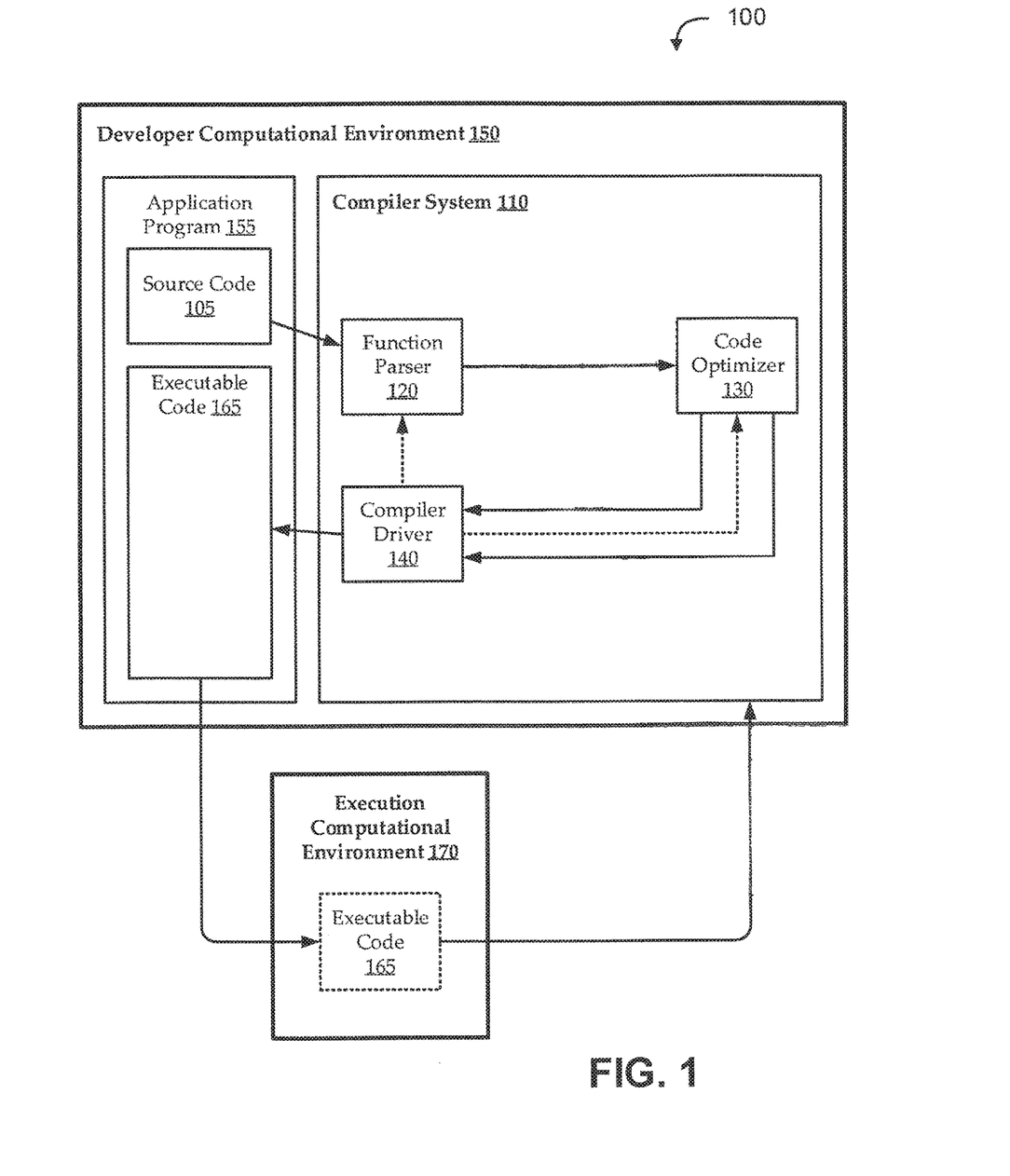
FIG. 1 illustrates a software development environment to provide context for various embodiments disclosed herein.

Before discussing the utilities disclosed herein in more detail, reference will initially be made to FIG. 1 which illustrates a software application environment 100 to provide a context for various embodiments. For the sake of clarity, the application environment 100 may be broken generally into a developer computational environment 150 and an execution computational environment 170. These computational environments can be part of a single computational environment (e.g., implemented on a single computer) or distributed among multiple computational environments. For example, the developer computational environment 150 can be optimized for compiling large applications and can exploit features, such as multi-core and/or parallel processing, resource off-loading (e.g., using cloud-based resources), etc.; and the execution computational environment 170 can be an end-user computer, a development computer configured to manifest expected features of an end-user computer, etc.

As illustrated, the developer computational environment 150 can include a compiler system 110 and an application program 155 (i.e., the target or input application to be compiled). The compiler system 110 can generally translate un-compiled "source" code 105 into compiled "executable" code 165 by using a number of compiler components, each configured to apply certain compiler system 110 functionality to certain types of code. Each compiler component can be implemented as a sub-component of another compiler component, can include one or more sub-components, etc. The compiler system 110 can run on a developer computational environment 150 (e.g., a personal computer or other computing platform). A developer (e.g., a software programmer) may develop the source code 105 by writing and debugging code segments in a high-level programming or scripting language such as C++ or the like. The developer can then send the source code 105 to the compiler system 110 (e.g., which may or may not be stored locally on the developer computational environment 150), and the compiler system 110 can compile the source code 105 into compiled executable code 165 using its various compiler components.

For instance, the compiler components can include a function parser 120, a code optimizer 130, a compiler driver 140, and the like. The various components of the compiler system 110 may be generally configured to convert the source code 105 into one or more object files through generation of one or more internal or intermediate representations (IRs, data structure(s) or code used internally by the compiler system 110 to represent the source code 105). While not shown, the computational environment 150 may also include one or more linkers/editors or the like configured to generally generate the executable code 165 (e.g., one or more binaries) from a number of object files, perform any necessary linking and binding, and create one or more running or runnable processes. While the various components are shown separately, they can be implemented in any suitable manner as one or more components. For example, the function parser 120 and/or the code optimizer 130 can be directed by the compiler driver 140 as indicated by the dashed arrows.

Figure 2:
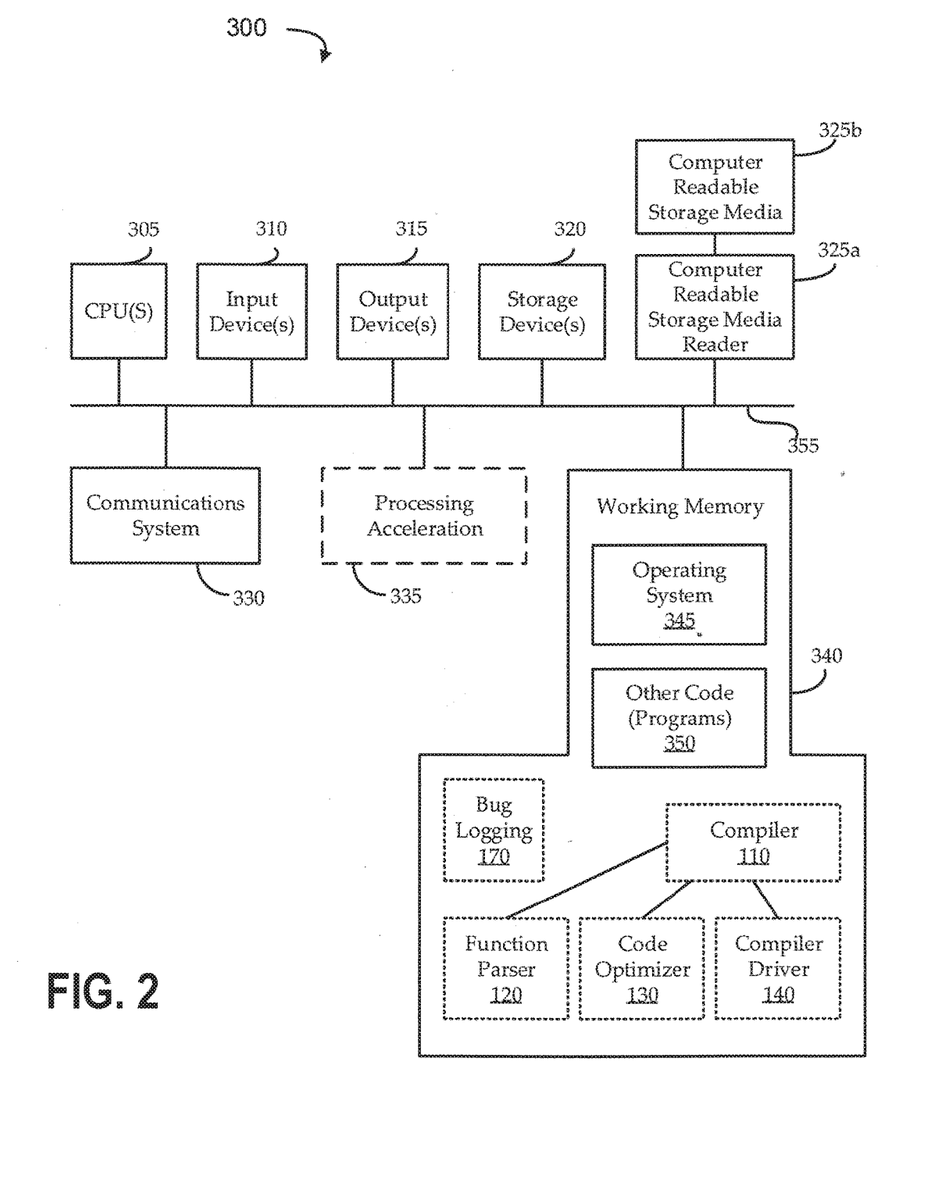
FIG. 2 illustrates a computational environment in which various embodiments disclosed herein may be implemented.

FIG. 2 shows an exemplary computational environment 300, in the context of which various embodiments herein may be implemented. The computational environment 300 may be implemented as or embodied in single or distributed computer systems, or in any other useful way. The computational environment 300 is shown including hardware elements that may be electrically coupled via a bus 355. As shown, the hardware elements may include one or more processors or processing devices 305 (e.g., CPUs), one or more input devices 310 (e.g., a mouse, a keyboard, etc.), and one or more output devices 315 (e.g., a display device, a printer, etc.). The computational environment 300 may also include one or more storage devices 320 such as disk drives, optical storage devices, solid-state storage device such as a random access memory (RAM) and/or a read-only memory (ROM), which can be programmable, flash-updateable and/or the like. In some embodiments, the storage devices 320 can be used to store source code 105, intermediate representations, object files, executable code 165, and/or other suitable data and/or functions.

The computational environment 300 may additionally include a computer-readable storage media reader 325a, a communications system 330 (e.g., a modem, a network card (wireless or wired), an infrared communication device, etc.), and working memory 340, which may include RAM and ROM devices as described above. In some embodiments, the computational environment 300 may also include a processing acceleration unit 335, which can include a DSP, a special-purpose processor, and/or the like. The computer-readable storage media reader 325a can further be connected to a computer-readable storage medium 325b, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with a network and/or any other computer described above with respect to the computational environment 300.

The computational environment 300 may also include software elements, shown as being currently located within a working memory 340, including an operating system 345 and/or other code 350, such as an application program (which may be a client application, web browser, mid-tier application, RDBMS, etc.). For example, embodiments can be implemented as instructions, which, when executed by one or more processors 305, cause the processors 305 to perform certain functions. Such functions can include functionality of a compiler system 110, including any of a function parser 120, a code optimizer 130, a compiler driver 140, etc., such as those described above with reference to FIG. 1. For example, embodiments of the compiler 110 may interact with an application program 155 as code 350 loaded into working memory 340. The compiler 110 can be a set of programs or instructions for translating source code 105 of an application program 155 into one or more IRs and/or executable code 165.

Figure 3:
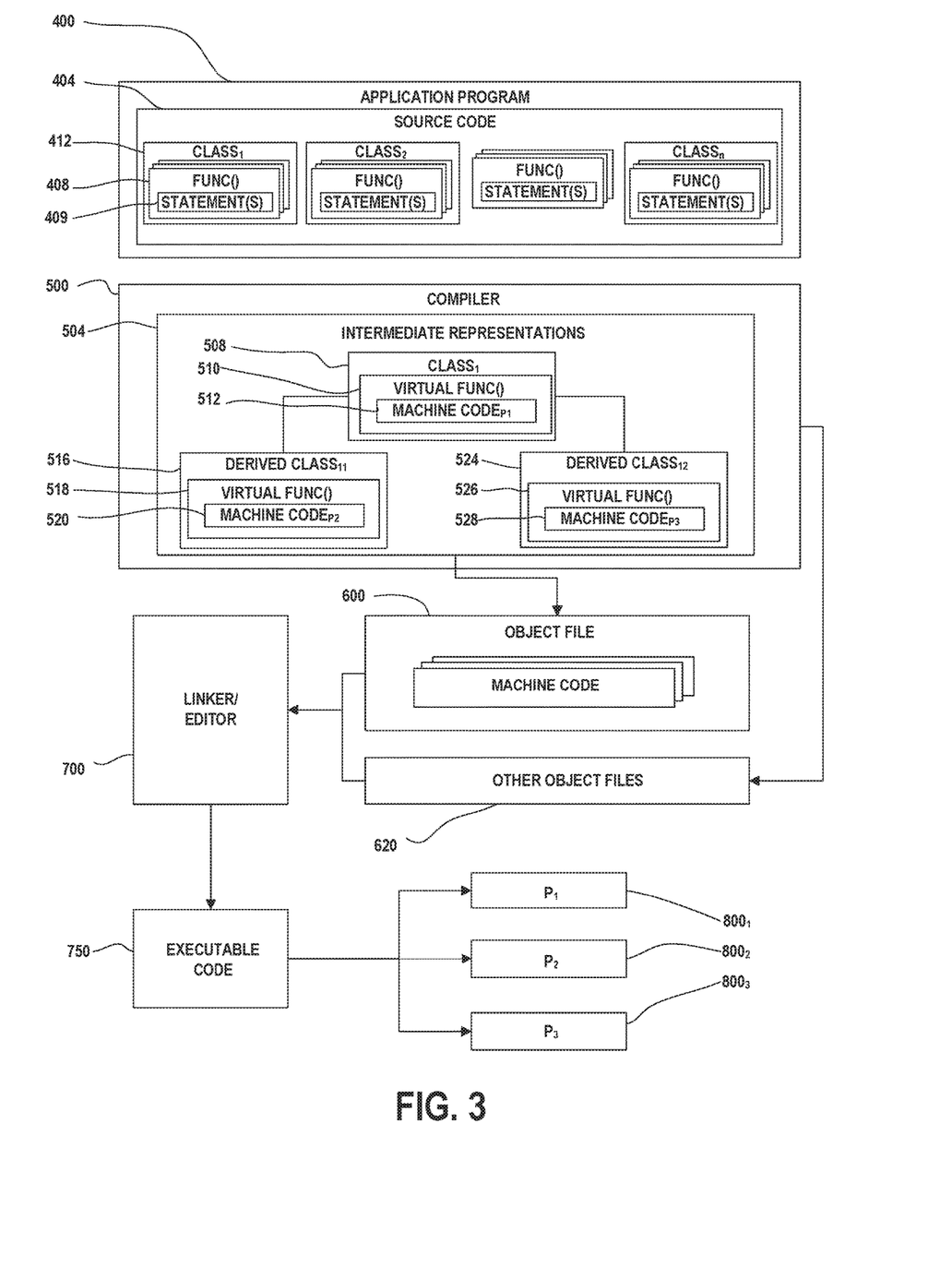
FIG. 3 is a block diagram illustrating a compiler that is configured to generate various intermediate representations of a class in which a function is defined in source code and one or more derived classes of the class for use in generating an object file that allows different versions of the function to be executed on different processing devices.
Figure 5:
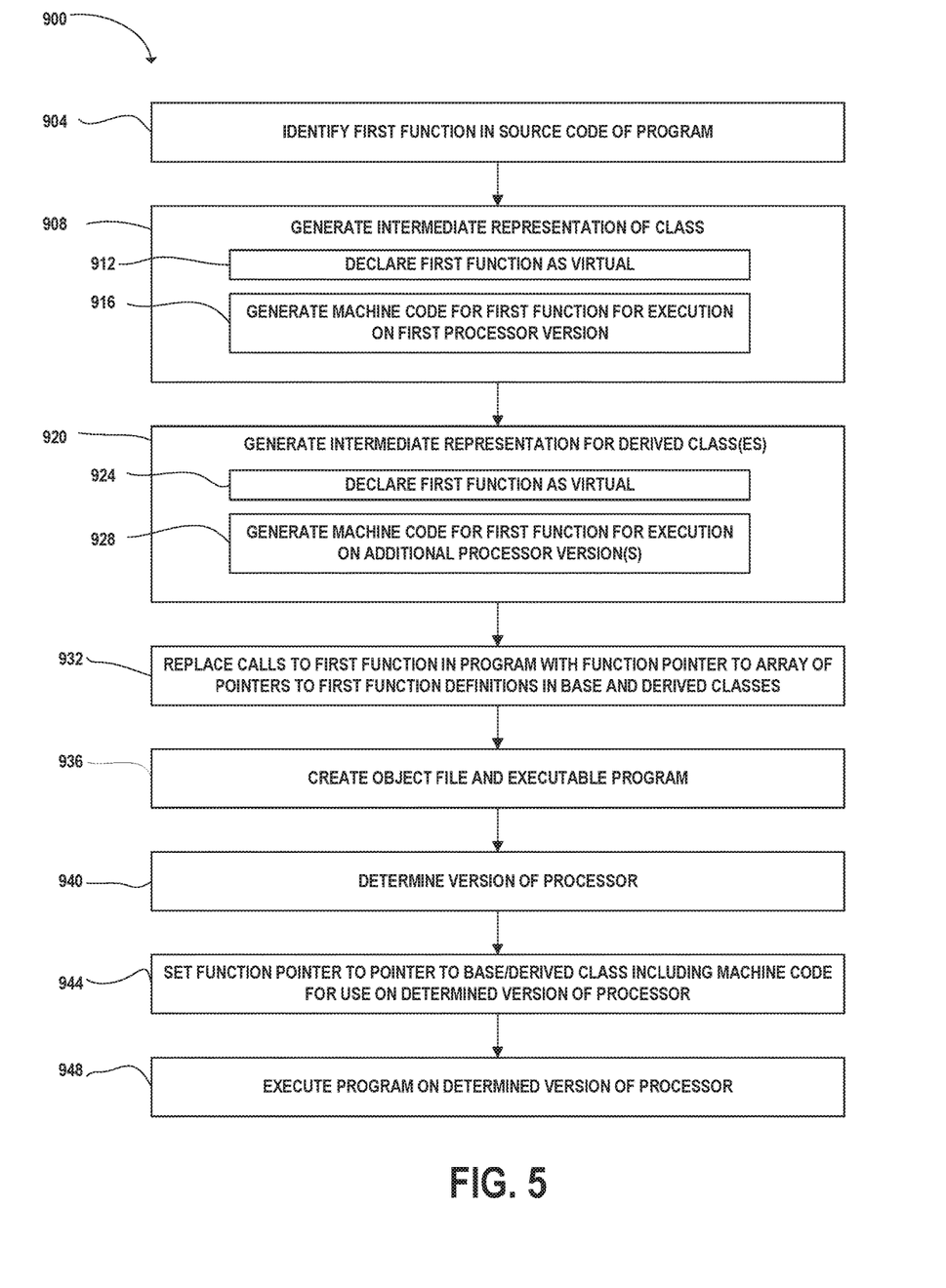
FIG. 5 is a flow diagram of a method for use in compiling source code of a program in a manner that allows for the execution of different versions of a function based on a particular version of a processor on which the program is to be executed.

As mentioned, software source code can be written by a developer in a high-level language such as C++ or the like and stored on a computer readable medium (e.g., storage device(s) 320 or computer readable storage medium 325b). The compiler 110 can compile the source code according to a set of components (e.g., optimizations, etc.), which can be directed by the compiler driver 140 for instance, to generate IRs, object files, and the like, all for purposes of the generation of an executable file or binary that may be executed on a processor (e.g., processor 305). With reference now to FIG. 3, a block diagram is illustrated of a compiler 500 (e.g., compiler system 110) that is configured to generate various IRs of a class for defining a particular function identified in source code 404 of an application program 400 (e.g., application program 155) and one or more derived classes of the class for use in generating an object file 600 that allows different versions of the function to be executed on different processing devices $800_1$, $800_2$, $800_3$, (e.g., processors 305). Reference will also now be made to FIG. 5 which presents a flow diagram of a method 900 for use in compiling source code of a program in a manner that allows for the execution of different versions of a function based on a particular version of a processor on which the program is to be executed.

At step 904 of the method 800 of FIG. 5, a first function 408 may be identified in the source code 404 of the application program 400 that is configured to be executed differently and/or more efficiently on different processor versions and/or architectures. It is to be understood herein that use of "first function," "second function," does not necessarily connote any particular order or position in which the functions are found in the source code 404 and that such designations are merely used to differentiate one function from another function. In one arrangement, a user may manually identify and indicate in any appropriate manner (e.g., via developer computational environment 150 of FIG. 1 and/or input device(s) 310 of FIG. 2) the first function. Additionally or alternatively, the compiler 500 may be configured to profile the source code 404 for one or more functions that are capable of being translated into different machine code versions for different corresponding processor versions and/or architectures in any appropriate manner.

As shown in FIG. 3, the first function 408 (and other functions 408) may be defined in one or more classes 412 (e.g., data structures, user-defined types, etc.) in the source code 404 and include one or more statements 409 that are configured to perform one or more tasks. For instance, the source code 404 may be written in an object-oriented programming language such as C++, where each class 412 is a C++ class. However, the first function 408 may in other arrangements not be defined in a class in the source code 404. In any case, the method 900 may then include generating 908 an IR 508 of a base class 508 to declare the first function and define the first function by a machine code representation thereof (e.g., machine code representation of the statements 409) that is specifically generated for execution on a first architecture or version $800_1$ of a processing device (e.g., the machine code is specifically generated to take advantage of one or more particular features of the first version of the processing device). That is, the compiler 500 may be configured to generate 916 machine code 512 representing the first function 408 for execution on the first processor version and append or store the same in the base class IR 508 (e.g., in other words, the compiler 500 may encapsulate the first function 408 in the base class IR 508). For instance, the compiler 500 may have any appropriate functionality that is configured to translate source code portions into machine code for execution on a plurality of different processor versions and/or architectures.

In the case where the first function 408 is defined in a class in the source code 404 (in Class' 412 in FIG. 3), the compiler 500 may be configured to name the base class IR 508 with the same or similar name (e.g., "USR1") as used to name the class 412 in the source code 404 (although doing so is not a requirement). Alternatively, the compiler 500 may be configured to generate the base class IR 508 without regard to a class within which the first function 408 is defined in the source code 404 or even if the first function 408 is not even defined in a class in the source code 404 in the first place.

To maintain the programming language mechanism of the source code 404, the compiler 500 may generate the base class IR 508 (as well as other IRs 504) using data structures, semantics, etc. the same as or similar to those of the source code 404. In the case of the source code 404 being written in C++, for instance, the compiler 500 may generate the IR 508 as if it was generating a C++ class 412 in the source code 404. Stated differently, the IR 508 of the class 412 may look substantially the same as the class 412 itself. The various IRs 504 may be stored in working memory 340 (see FIG. 2) or the like and accessible in any appropriate manner.

With reference again to FIG. 5, the method 900 may also include generating 920 an IR 516 of a derived class of the base class in the IR 508 (where the derived class is at least partially defined in terms of the base class in the IR 508) that includes a machine code representation 520 of the first function 408 that is specifically generated for execution on an additional architecture or version (second version $800_2$) of a processing device (e.g., the machine code is specifically generated to take advantage of one or more particular features of the second version of the processing device). That is, the compiler 500 may be configured to generate 916 machine code 520 representing the first function 408 for execution on the second processor version and append or store the same in the derived class IR 516. The compiler 500 may generate additional derived class IRs (e.g., derived class IR 524) including machine code representations (e.g., machine code 528) of the first function for execution on additional processor architectures and/or versions (e.g., third version $800_3$).

The various IRs 504 may be encapsulated in a single object file 600 and/or executable program and one of the specific machine code versions of the first function may be pointed to based on a particular version of processor on which the program is to be executed as discussed in more detail below. In this regard, and as shown in FIG. 5, the method 900 may also include declaring 912, 924 the first function as "virtual" in the base class IR 508 and in the derived class IRs 516, 524. As the first function has been declared as virtual in the IRs 508, 516, 524 (e.g., "virtual func( )") and includes different machine code 512, 520, 528 specific to a different processor version $800_1$, $800_2$, $800_3$, the virtual function has been identified by different reference numerals 510, 518, 516 in FIG. 3 (even though each of the IRs 508, 516, 524 uses the same name, e.g., "func( )", to identify its respective piece or segment of machine code 512, 520, 528).

Figure 4:
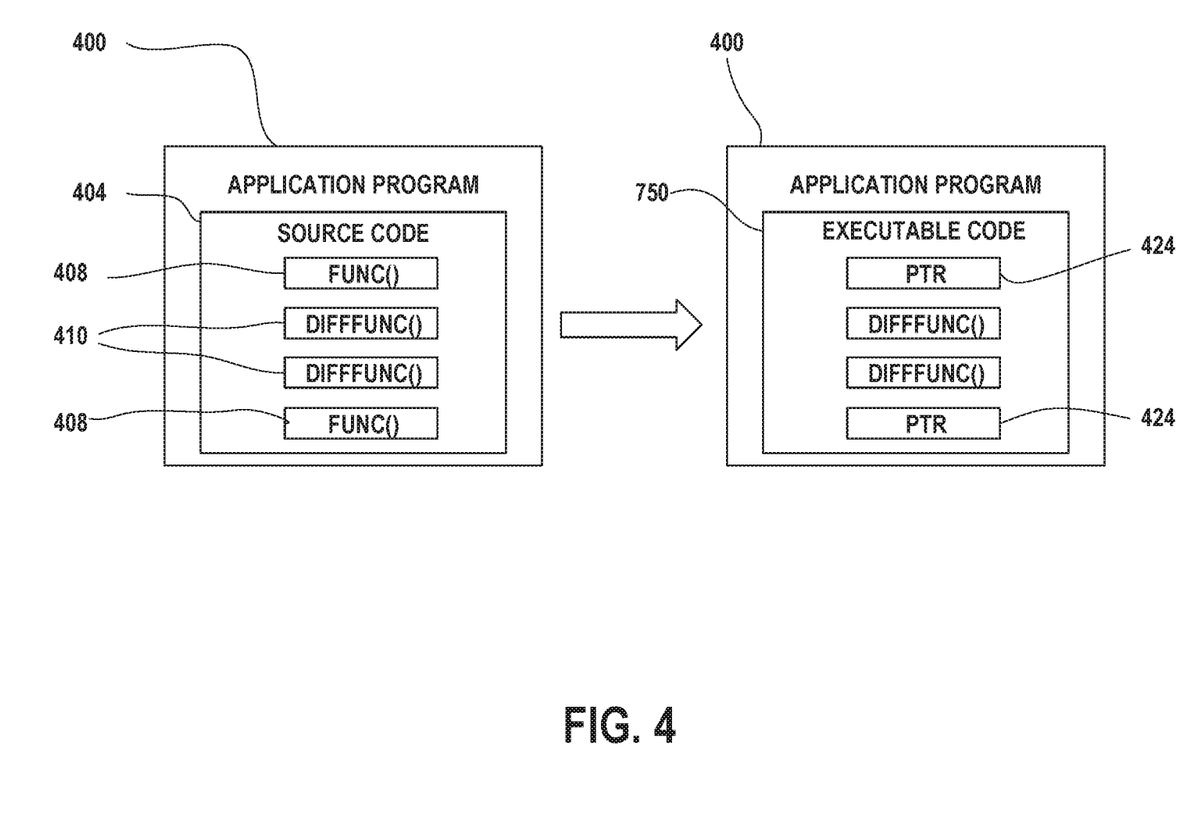
FIG. 4 schematically illustrates replacing of function call sites in the application with pointers to one or more classes of FIG. 3.

By declaring the first function as virtual in IRs 508, 516, 524, the compiler 500 automatically replaces 932 all calls to the first function (e.g., all calls to "func( )") in the program 400 with a function pointer 424 (see FIG. 4) that points to an array of pointers to the respective various machine code definitions of "func( )" in the IRs 508, 516, 524 (or in any appropriate data structures representing the IRs 508, 516, 524). In one arrangement, the function pointer may be initialized before the first call to func( ) in any appropriate manner. For instance, the compiler 500 may create an initialization class (e.g., an IR) that includes the function pointer. Upon instantiation of the initialization class (e.g., _init_USR1), a real object of the class may be created and the function pointer (e.g., virtual function pointer) may be set pointing to the appropriate base/derived class of a specific processor. In any event, step 936 of the method 900 generally includes generating an executable or object file 600 (e.g., by way of coalescing the various IRs in any appropriate manner) as well as one or more other object files 620 and creating or assembling executable code 750 (e.g., by linker/editor 700) that may be executed on any of the various processor versions $800_1$, $800_2$, $800_3$ for which machine code was generated as discussed above.

Again with reference to FIG. 5, the method 900 may include determining 940 a version of a processor on which the executable code 750 is to be executed in any appropriate manner (e.g., one of processor versions $800_1$, $800_2$, or $800_3$, such as via automatic detection, user input, etc.), setting 944 the function pointer(s) 424 to a pointer that points to the machine code specific to the determined version of the processor, and executing 948 the program on the determined version of the processor (which includes executing the specific version of the machine code when the first function is called in the program). In one arrangement, the function pointer 424 can be set to a pointer of a particular one of the derived classes at run-time by the run-time system. In another arrangement, the function pointer 424 can be set by the compiler 500 or linker/editor 700 (e.g., if it is known at such time on which processor version the program is to be executed).

While not discussed in more detail, it is to be understood that the above discussion may be applicable to second or additional functions in the source code 404 for which multiple versions of machine code for respective execution on multiple versions or architectures of processors may be advantageously generated. In one arrangement, the compiler 500 may generate a different respective object file 600 that includes various machine code versions for each different function in the source code. In another arrangement, the compiler 500 may generate a single object file 600 that includes various machine code versions for various different functions in the source code.

Table 1, below, illustrates a simplified example of a portion of C++ source code that may be received by the compiler 500, where the source code includes a function "func( )" defined in a class "USR1":

TABLE 1

```
class USR1 {              // treat this as the sparc3 base
public:
    int func( );
    int get_data( );
private:
    int data;
};
int USR1::func( ) { printf("USR1\n"); }
int USR1::get_data( ) { return data; }
```

Table 2, below, illustrates a simplified example of a number of IRs representing the above class in the source code as well as a number of derived classes of the above class, where the IRs utilize expressions the same as or similar to those of C++:

TABLE 2

```
#include <stdio.h>
// Original user class
class _init_USR1;               // Added by compiler under -xmultiarch
class USR1 {                    // Generate this base class with sparc3 ISA
friend class _init_USR1;        // Added by compiler under -xmultiarch
public:
    virtual int func( );        // Make func virtual
    int get_data( );
private:
    int data;
};
// func( ) contains generated sparc3 code
int USR1::func( ) { /*...*/ printf("USR1\n"); return 3; }
int USR1::get_data( ) { return data; }
// Compiler added new USR1_sparc4 class for sparc4 ISA
// ----------------------------------------------------------------
class USR1_sparc4 : USR1 {
friend _init_USR1;
public:
    virtual int func( );
};
// func( ) contains generated sparc4 code
int USR1_sparc4::func( ) { /*...*/ printf("USR1_sparc4!!\n"); return 4; }
// Compiler added new USR1_sparc5 class with sparc5 ISA
```

TABLE 2-continued

```
// ----------------------------------------------------------------
class USR1__sparc5 : USR1 {
friend __init__USR1;
public:
    virtual int func( );
};
// func( ) contains generated sparc5 code
int USR1__sparc5::func( ) { /*...*/ printf("USR1__sparc5!!\n"); return 5; }
// Compiler generated init class and globals under -xmultiarch
// ----------------------------------------------------------------
enum ARCH { sparc3, sparc4, sparc5 } arch;
int (USR1::*funcPtr)( );
USR1 *usrPtr;
struct __init__USR1 {
        __init__USR1( ) {
            // set arch by checking environment for current architecture
            arch = sparc5; // for example
            USR1 __isa3;
            USR1__sparc4 __isa4;
            USR1__sparc5 __isa5;
            funcPtr = &USR1::func;
            switch (arch) {
                case sparc4: usrPtr = &__isa4 ; break;
                case sparc5: usrPtr = &__isa5; break;
                    default: usrPtr = &__isa3; break;    // default sparc3
            }
        } // __init__USR1 constructor
};
// Adjusted user call sites
// ----------------------------------------------------------------
int main( )
{
        // initialization of all arch function ptrs
        __init__USR1 usr;
        // Now anywhere we used to have USR1::func( ) call, use funcPtr instead.
        // The version of func of the current architecture will be called.
        (usrPtr->*funcPtr)( );
        return 0;
}
```

The present utilities disclosed herein advantageously improve computational environments designed to compile source code for execution by multiple processors of different architectures and/or types by providing for reduced levels of code bloating, no or limited changes to the source code, no or limited special code and/or data sections in the executable, and the like. More specifically, the disclosed utilities improve the above technology by way of a combination of a number of particular steps including the initial identification of one or more functions in source code (e.g., C++ source code) of a program configured to be executed differently and/or more efficiently on different processor versions and/or architectures, the generation of various compiler IRs using language or semantics the same as or similar to that of the source code and respectively including machine code representing the function for execution on the different processor versions and/or architectures, the generation of a single object or executable file including such machine code versions, the replacement of calls to the function in the program with a function pointer to the machine code versions, and the like.

It will be readily appreciated that many deviations may be made from the specific embodiments disclosed in the specification without departing from the spirit and scope of the invention. As just one example, it is not always necessary that the base and one or more derived classes that define various machine code representations of a particular function for various corresponding processor versions and/or architectures are generated in respective corresponding IRs by the compiler. For instance, the compiler may be configured in at least some contexts to perform transformations of source code into machine code for execution by a processor without the generation or use of IRs. Also, it should be understood that the functionalities performed by many of the processes and modules discussed herein may be performed by other modules, devices, processes, etc. The illustrations and discussion herein has only been provided to assist the reader in understanding the various aspects of the present disclosure. Furthermore, one or more various combinations of the above discussed arrangements and embodiments are also envisioned.

As mentioned, embodiments disclosed herein can be implemented as one or more computer program products, i.e., one or more modules of computer program instructions encoded on a computer-readable medium for execution by, or to control the operation of, data processing apparatus (processors, cores, etc.). The computer-readable medium can be a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

A computer program (also known as a program, software, software application, script, or code) used to provide the functionality described herein can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

We claim:

1. A computer-implemented method for use in compiling source code of a computer program, the method comprising:
    receiving source code of a program that includes a plurality of functions;
    identifying a first function of the plurality of functions in the source code;
    generating a base class intermediate representation (IR) that includes machine code representing the identified first function for execution on a first version of a processor; and
    generating at least one derived class IR of the base class IR that includes machine code representing the identified first function for execution on at least one additional version of the processor, wherein the at least one derived class is at least partially defined in terms of the base class, wherein the machine code of the base class or at least one derived class of the base class is configured to be executed by a processor based upon a determined version of the processor;
    coalescing the base class and the at least one derived class of the base class into a single object file.

2. The method of claim 1, further including:
    replacing calls to the first function in the source code with pointers to the base class or the at least one derived class of the base class.

3. The method of claim 2, further including:
    determining that the program is to be executed on the first version of the processor, wherein the replacing step includes replacing calls to the first function in the source code with pointers to the base class; and
    executing the program on the first version of the processor, wherein the executing includes executing the machine code representing the first function for execution on the first version of the processor.

4. The method of claim 2, further including:
    determining that the program is to be executed on the at least one additional version of the processor, wherein the replacing step includes replacing calls to the first function in the source code with pointers to the at least one derived class of the base class; and
    executing the program on the at least one additional version of the processor, wherein the executing includes executing the machine code representing the first function for execution on the at least one additional version of the processor.

5. The method of claim 1, wherein the generating the base class includes declaring the first function as virtual, and wherein generating the at least one derived class of the base class includes declaring the first function as virtual.

6. The method of claim 1, further including:
    instantiating the base class to generate an object that includes a pointer to the base class or the at least one derived class of the base class based upon the determined version of the processor.

7. The method of claim 1, further including:
    profiling the source code, wherein the identifying step occurs as a result of the profiling step.

8. The method of claim 1, wherein the base class is a first base class, and wherein the method further includes:
    identifying a second function in the source code;
    generating a second base class that includes machine code representing the second function for execution on the first version of a processor; and
    generating at least one derived class of the second base class that includes machine code representing the second function for execution on at least one additional version of the processor, wherein the machine code of the second base class or the at least one derived class of the second base class is configured to be executed by a processor based upon a determined version of the processor.

9. The method of claim 8, further including:
    replacing calls to the second function in the source code with pointers to the second base class or the at least one derived class of the second base class.

10. The method of claim 9, further including:
    determining that the program is to be executed on the at least one additional version of the processor, wherein the replacing step includes replacing calls to the second function in the source code with pointers to the at least one derived class of the second base class; and
    executing the program on the at least one additional version of the processor, wherein the executing includes executing the machine code representing the second function for execution on the at least one additional version of the processor.

11. The method of claim 1, further including:
    linking the single object file with other compiled portions of the source code to generate an executable file; and
    executing the executable file with a processing device.

12. The method of claim 11, further including:
    determining that the processing device is the at least one additional version of the processor, wherein the executing step includes executing the machine code representing the first function for execution on the at least one additional version of the processor.

13. A non-transitory, computer-readable storage medium, storing program instructions that when executed on one or more computers cause the one or more computers to perform:
    identifying a first function defined within a C++ class in source code of a program to be optimized for execution by a plurality of different versions of a processor, wherein the first function is identified by a first function name in the source code;

declaring the first function name as virtual in an intermediate representation of the C++ class;
generating machine code that represents the first function for execution on a first version of the plurality of different versions of the processor;
appending the generated machine code that represents the first function for execution on the first version of the processor to the first function name in the IR of the C++ class;
generating additional machine code that represents the first function for execution on one or more additional versions of the plurality of different versions of the processor;
appending the generated machine code that represents the first function for execution on the one or more additional versions of the plurality of different versions of the processor to the first function name in one or more IRs of one or more derived classes of the C++ class; and
replacing calls to the first function name in the program with calls through a pointer that points to the first function name in the C++ class or one of the one or more derived classes of the C++ class based on the particular version of the processor on which the program is to be executed.

14. The non-transitory, computer-readable storage medium of claim 13, further storing program instructions that when executed on one or more computers cause the one or more computers to perform:
determining that the program is to be executed on the first version of the processor, wherein the replacing step includes replacing calls to the first function name in the source code with pointers to the first function name in the C++ class;
executing the program on the first version of the processor, wherein the executing includes executing the machine code representing the first function for execution on the first version of the processor.

15. The non-transitory, computer-readable storage medium of claim 13, further storing program instructions that when executed on one or more computers cause the one or more computers to perform:
determining that the program is to be executed on one of the one or more additional versions of the processor, wherein the replacing step includes replacing calls to the first function in the source code with pointers to the first function name in the at least one derived class of the C++ class; and
executing the program on the one of the one or more additional versions of the processor, wherein the executing includes executing the machine code representing the first function for execution on the one or more additional versions version of the processor.

16. The non-transitory, computer-readable storage medium of claim 13, wherein the first version of the processor is a lower version that are the one or more additional versions of the processor.

17. A computer-implemented method for dynamic selection and implementation of compiler-generated machine code for a program based on a determined version of processing device for executing the program, the method comprising:
receiving, at a compiler, source code of a program that includes a plurality of functions;
identifying a first of the plurality of functions;
generating an intermediate representation (IR) of a first C++ class of the first function that includes machine code representing the first function for execution on a first version of a processing device;
generating an IR of a derived C++ class of the first C++ class of the first function that includes machine code representing the first function for execution on a second version of the processing device, wherein the IR of the derived C++ class is at least partially defined in terms of the base class;
coalescing the IRs of the first C++ class and the derived C++ class of the first C++ class into an object file; and
assembling the object file with other compiled portions of the source code into an executable file.

18. The method of claim 17, further including:
determining that the executable file is to be executed on the first version of the processing device;
pointing calls to the first function in the executable file to the machine code representing the first function for execution on the first version of the processing device; and
executing the executable file on the first version of the processing device.

19. The method of claim 17, further including:
determining that the executable file is to be executed on the second version of the processing device;
pointing calls to the first function in the executable file to the machine code representing the first function for execution on the second version of the processing device; and
executing the executable file on the second version of the processing device.

\* \* \* \* \*

UNITED STATES PATENT AND TRADEMARK OFFICE
CERTIFICATE OF CORRECTION

PATENT NO. : 10,289,394 B2
APPLICATION NO. : 15/290059
DATED : May 14, 2019
INVENTOR(S) : Huang et al.

It is certified that error appears in the above-identified patent and that said Letters Patent is hereby corrected as shown below:

In the Claims

In Column 16, Line 3, in Claim 15, after "versions" delete "version".

Signed and Sealed this
Twenty-first Day of July, 2020

Andrei Iancu
*Director of the United States Patent and Trademark Office*